3,060,080
METHOD OF COMBATTING INSECTS EMPLOYING THIOPYROPHOSPHORIC ACID ESTERS

Walter Lorenz, Wuppertal-Vohwinkel, and Gerhard Schrader, Wuppertal-Cronenberg, Germany, assignors to Farbenfabriken Bayer Aktiengesellschaft, Leverkusen, Germany, a corporation of Germany
No Drawing. Filed June 16, 1958, Ser. No. 742,020
5 Claims. (Cl. 167—22)

The present invention relates to and has as its objects thiono-thiopyrophosphoric acid tetra-alkyl esters of the general formula

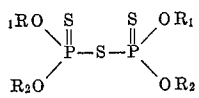

wherein $R_1$ and $R_2$ stand for low molecular weight alkyl radicals with 1–4 carbon atoms.

Thiono-thiopyrophosphoric acid tetra-alkyl esters of the general formula

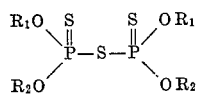

wherein $R_1$ and $R_2$ denote long-chain alkyl radicals, are known in literature and have been proposed for example as flotation agents (cf. for example U.S. Patents Nos. 2,198,915 and 2,063,629). These compounds are obtainable by reacting dialkyl-dithiophosphoric acids with acyl chlorides.

Thiopyrophosphoric acid esters of the general formula

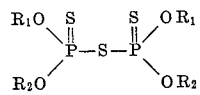

wherein $R_1$ and $R_2$ stand for alkyl radicals are also known and obtainable for example according to the instructions of German patent specification No. 820,001 by condensation of sulfur dichloride or dialkylamino sulfenic acid chlorides with any dialkyl phosphites.

The new thiono-thiopyrophosphoric acid tetra lower alkyl esters of the present invention are easily obtainable by reacting sulfur dichloride or dialkylamino sulfenic acid chlorides with the dialkylthiol-phosphites recently reported by Kabachnik and Mastryukova (Bull. Acad. Sci. USSR [1952], pages 661–666). The reaction proceeds as in the case of dialkyl-phosphites in the following manner:

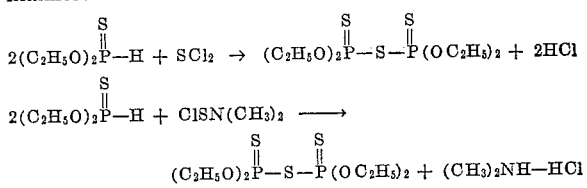

The reaction of dialkyl-thiolphosphites with sulfur dichloride or dialkylamino-sulfenic acid chlorides proceeds already at low temperatures, preferably in the presence of suitable solvents. Petroleum ether, ligroin, benzene, toluene and similar solvents have proved to be particularly useful. The reaction is strongly exothermic.

Some of the new products are liquids which are easily distillable under vacuum; others are readily crystallizing compounds which are solid at room temperature.

In addition to general contact-insecticidal properties these low members of thiono-thiopyrophosphoric acid tetra-alkyl esters exhibit an outstanding action on resistant red spiders. In some cases the new compounds have also a systemic action and some are also suitable for combatting eating insects such as caterpillars. They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As an example for the special utility of the inventive compounds the ester of the following formula

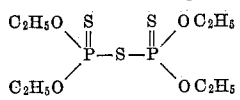

has been tested against aphids, spider mites and caterpillars. Aqueous solutions of the aforementioned compound have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration.

The tests have been carried out in the following manner:

(a) Against aphids (species *Doralis fabae*). Heavily infested bean plants (*Vitia faba*) have been sprayed drip wet with 0.001% solutions as prepared above. The effect has been determined after 24 hours by counting the dead pests either on the surface of the soil or still remaining on the plants. The aphids were killed to 80%;

(b) Against spider mites (resistant, species *Tetranychus telarius* Hanst.). The tests have been performed on *Phaseolus vulgaris*. The plants have been sprayed drip wet with 0.01% solutions prepared as described above. Evaluation has been carried out after 24 hours, 48 hours and 8 days. The spider mites were killed completely;

(c) Against caterpillars (*Plutella maculipennis*). Young white cabbage plants were sprayed drip wet with aqueous solutions of 0.1% as prepared above. Then the plants were infested with 10 to 20 caterpillars and sprayed again. Evaluation occurred after 24 hours, 48 hours and 96 hours, whereafter complete killing was obtained.

The following examples are given for the purpose of illustrating the invention and describing the biological properties of the new compounds.

Example 1

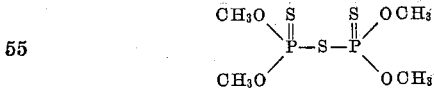

To a solution of 27 grams (0.24 mol) of dimethylaminosulfenic acid chloride (B.P. 27° C./10 mm. Hg) in 270 millilitres of the petroleum ether there are added dropwise with cooling at 20–25° C. 63 grams (0.5 mol) of dimethyl-thiolphosphite (B.P. 53° C./16.5 mm. Hg) dissolved in 100 millilitres of petroleum ether. After brief after-stirring the solution is filtered off with suction from the dimethylamino hydrochloride formed. The petroleum ether solution is washed with a little water, dried and distilled. After first runnings of a small amount of low boiling compounds the tetramethyl-dithiono-thiopyrophosphate boils at 82–83° C./0.01 mm. Hg. It is a colorless somewhat cloudy oil which on standing in ice solidifies to form crude crystals softening already at room temperature and melting at body temperature. Yield: 15 grams, corresponding to 21.5% of the theoretical.

*Example 2*

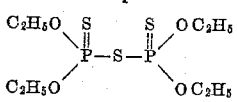

27 grams (0.24 mol) of dimethylamino-sulfenic acid chloride (B.P. 27° C./10 mm. Hg) are dissolved in 270 millilitres of petroleum ether. To this solution there is added dropwise at 10–15° C. a solution of 78 grams (0.5 mol) of diethyl-thiolphosphite (B.P. 68° C./12 mm. Hg) in 100 millilitres of petroleum ether. The exothermic reaction is restrained by cooling with ice-water. When the reaction is completed, the solution is filtered off with suction from the dimethylamino hydrochloride formed and the petroleum ether layer is then washed with a little water. After distilling off the solvent 43 grams of tetra-ethyl dithiono-thiopyrophosphate are obtained as a pale yellow oil which rapidly crystallizes. Yield: 43 grams, corresponding to 43.5% of the theoretical. From a little petroleum ether the ester is obtained in colorless crude leaflets of M.P. 50° C.

Toxicity on rats per os $LD_{50}$: 100 mg./kg. Aphids are still killed to 80% by 0.001% solutions. Spider mites are killed completely with 0.01% solutions. Caterpillars are destroyed with 0.1% solutions.

*Example 3*

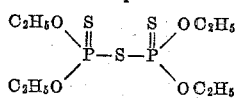

To 10 grams (0.1 mol) of sulfur dichloride dissolved in 200 millilitres of petroleum ether there is added dropwise at 0–10° C. a solution of 32 grams (0.2 mol) of diethyl-thiolphosphite (B.P. 68° C./12 mm. Hg) in 100 millilitres of petroleum ether. When the exothermic reaction has subsided, the solution is washed with water and a little dilute sodium bicarbonate solution until the reaction is neutral in order to remove the hydrogen chloride. The solvent is dried over sodium sulfate and distilled off. The residual tetraethyldithiono-thiopyrophosphate (30 grams) distils at 110° C./0.01 mm. Hg as a nearly colorless oil which rapidly crystallizes and is obtained in a pure state by freeing it from a small amount of adhering oily products by squeezing on clay. Yield: 22 grams, corresponding to 55.5% of the theoretical, M.P. 45–46° C.

*Example 4*

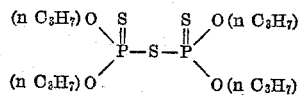

To a solution of 27 grams (0.24 mol) of dimethylamino-sulfenic acid chloride in 270 millilitres of petroleum ether there is added dropwise at 10–15° C. with occasional cooling a solution of 91 grams (0.5 mol) of di-n-propyl-thiolphosphite (B.P. 62–63° C./3 mm. Hg) in 160 millilitres of petroleum ether. After brief afterstirring the solution is filtered off with suction from the dimethylamino hydrochloride, the petroleum ether layer is washed with water, dried over sodium sulfate and the solvent is distilled off. The tetra-n-propyl-di-thiono-thiopyrophosphate then boils almost without a residue at 124° C./0.01 mm. Hg as a colorless oil which crystallizes on cooling to −70° C. and becomes liquid again at below 0° C. Yield: 84 grams, corresponding to 85% of the theoretical.

*Example 5*

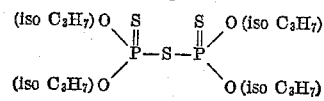

27 grams (0.24 mol) of dimethylamino-sulfenic acid chloride are dissolved in 270 millilitres of petroleum ether. 91 grams (0.5 mol) of diisopropyl-thiolphosphite (B.P. 49–50° C./3 mm. Hg) dissolved in 100 millilitres of petroleum ether are added dropwise with cooling at 10–15° C. After stirring for a further 15 minutes the solution is filtered off with suction from the dimethylamino hydrochloride formed, the petroleum ether layer is washed with water and dried, and the solvent is distilled off. 81 grams of the tetra-isopropyl-dithiono-thiopyrophosphate are thus obtained as a colorless somewhat viscous oil which crystallizes in an ice-bath and can be distilled in small amounts. B.P. 105–108° C./0.01 mm. Hg. Yield: 82% of the theoretical.

We claim:

1. A process for combatting insects which comprises exposing said insects to the action of a compound corresponding to the formula

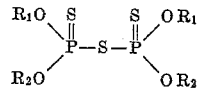

wherein $R_1$ and $R_2$ stand for low molecular weight alkyl radicals having 1–4 carbon atoms.

2. A process for combatting insects which comprises exposing said insects to the action of a compound corresponding to the formula

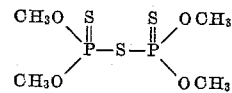

3. A process for combatting insects which comprises exposing said insects to the action of a compound corresponding to the formula

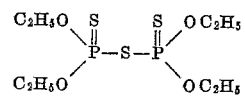

4. A process for combatting insects which comprises exposing said insects to the action of a compound corresponding to the formula

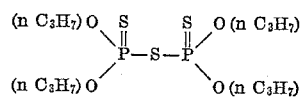

5. A process for combatting insects which comprises exposing said insects to the action of a compound corresponding to the formula

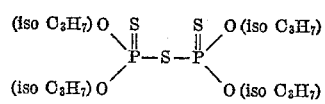

References Cited in the file of this patent

UNITED STATES PATENTS

| | | |
|---|---|---|
| 2,070,815 | MacAfee | Nov. 17, 1936 |
| 2,198,915 | MacAfee | Apr. 30, 1940 |
| 2,495,220 | Bell | Jan. 24, 1950 |
| 2,552,570 | McNab | May 15, 1951 |
| 2,582,204 | Kosolapoff | Jan. 8, 1952 |
| 2,586,655 | Hook | Feb. 19, 1952 |
| 2,596,076 | Hook | May 6, 1952 |
| 2,630,450 | Harman | Mar. 3, 1953 |
| 2,663,722 | Toy | Dec. 22, 1953 |
| 2,811,479 | Geary | Oct. 29, 1957 |
| 2,928,862 | Willard | Mar. 15, 1960 |
| 2,941,920 | Willard | June 21, 1960 |